US012698736B1

(12) United States Patent
Sidelkovskiy et al.

(10) Patent No.: US 12,698,736 B1
(45) Date of Patent: Aug. 4, 2026

(54) AIR CIRCUIT FOR AIRCRAFT PROPULSION SYSTEM

(71) Applicant: RTX Corporation, Farmington, CT (US)

(72) Inventors: Dmitriy Sidelkovskiy, Ellington, CT (US); Daniel B. Kupratis, Wallingford, CT (US); Gary Collopy, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/089,946

(22) Filed: Mar. 25, 2025

(51) Int. Cl.
*F02C 3/32* (2006.01)
*F02C 9/18* (2006.01)

(52) U.S. Cl.
CPC .................. *F02C 3/32* (2013.01); *F02C 9/18* (2013.01); *F05D 2260/601* (2013.01); *F05D 2260/606* (2013.01)

(58) Field of Classification Search
CPC ...... F02C 3/32; F02C 6/08; F02C 9/18; F02K 3/06; F02K 3/077; F05D 2260/601; F05D 2260/606
See application file for complete search history.

(56) References Cited

U.S. PATENT DOCUMENTS

| | | | |
|---|---|---|---|
| 4,698,964 A | 10/1987 | Glancy | |
| 5,209,633 A | 5/1993 | Mcgreehan | |
| 5,269,135 A * | 12/1993 | Vermejan | F02C 7/04 |
| | | | 60/266 |
| 5,435,127 A * | 7/1995 | Luffy | F02K 1/1223 |
| | | | 60/262 |
| 5,845,482 A | 12/1998 | Carscallen | |
| 7,946,104 B2 | 5/2011 | Frank | |
| 8,528,344 B2 | 9/2013 | Hans | |
| 9,260,974 B2 * | 2/2016 | Hasting | F01D 11/20 |
| 11,078,837 B2 * | 8/2021 | Zysman | F02C 6/08 |
| 2020/0063660 A1 * | 2/2020 | Mackin | F02C 7/14 |

* cited by examiner

*Primary Examiner* — Scott J Walthour
(74) *Attorney, Agent, or Firm* — Getz Balich LLC

(57) ABSTRACT

A propulsion system assembly includes a core flowpath, a bypass flowpath, a flowpath wall, an ejector body and an air circuit. The bypass flowpath is radially outboard of the core flowpath. The flowpath wall forms an inner peripheral boundary of the bypass flowpath. The flowpath wall extends axially along and circumferentially about an axis. The ejector body is disposed in the bypass flowpath. The ejector body is spaced radially outboard from the flowpath wall by a first distance such that a portion of the flowpath radially between the ejector body and the flowpath wall forms an ejector passage. The ejector passage extends axially along the axis from a passage inlet to a passage outlet. The air circuit extends from a circuit inlet to a circuit outlet. The circuit inlet is fluidly coupled to the core flowpath. The circuit outlet is fluidly coupled to the bypass flowpath at the passage outlet.

20 Claims, 10 Drawing Sheets

AIR CIRCUIT FOR AIRCRAFT PROPULSION SYSTEM

BACKGROUND OF THE DISCLOSURE

1. Technical Field

This disclosure relates generally to an aircraft propulsion system and, more particularly, to an air circuit for the aircraft propulsion system.

2. Background Information

A propulsion system for an aircraft may include one or more air circuits, including those which bleed core air from a core flowpath and exhaust that bled core air into a bypass flowpath. Various types and configurations of air circuits are known in the art. While these known air circuits have various benefits, there is still room in the art for improvement.

SUMMARY OF THE DISCLOSURE

According to an aspect of the present disclosure, an assembly is provided for an aircraft propulsion system. This assembly includes a core flowpath, a bypass flowpath, a flowpath wall, an ejector body and an air circuit. The core flowpath extends axially along an axis. The bypass flowpath is radially outboard of the core flowpath. The bypass flowpath extends axially along the axis. The flowpath wall forms an inner peripheral boundary of the bypass flowpath. The flowpath wall extends axially along and circumferentially about the axis. The ejector body is disposed in the bypass flowpath. The ejector body is spaced radially outboard from the flowpath wall by a first distance such that a portion of the flowpath radially between the ejector body and the flowpath wall forms an ejector passage. The ejector passage extends axially along the axis from a passage inlet to a passage outlet. The air circuit extends from a circuit inlet to a circuit outlet. The circuit inlet is fluidly coupled to the core flowpath. The circuit outlet is fluidly coupled to the bypass flowpath at the passage outlet.

According to another aspect of the present disclosure, another assembly is provided for an aircraft propulsion system. This assembly includes a flowpath, a flowpath wall, an ejector body, an air circuit and an air source. The flowpath extends axially along an axis. The flowpath wall forms an inner peripheral boundary of the flowpath. The flowpath wall extends axially along and circumferentially about the axis. The ejector body is spaced radially outboard from the flowpath wall such that an ejector passage is formed by and disposed radially between the ejector body and the flowpath wall. The ejector passage extends axially along the axis from a passage inlet to a passage outlet. The air circuit extends from a circuit inlet to a circuit outlet. The circuit outlet is fluidly coupled to the flowpath next to and downstream of the passage outlet. The air source is fluidly coupled to the circuit inlet.

According to still another aspect of the present disclosure, another assembly is provided for an aircraft propulsion system. This assembly includes a flowpath, a flowpath wall, an ejector body, an air circuit and an air source. The flowpath extends axially along an axis. The flowpath wall forms an inner peripheral boundary of the flowpath. The flowpath wall extends axially along and circumferentially about the axis. The ejector body is disposed radially outboard of and extends circumferentially about the flowpath wall. The ejector passage is formed by and disposed radially between the ejector body and the flowpath wall. The ejector passage extends axially along the axis from a passage inlet to a passage outlet. The air circuit extends from a circuit inlet to a circuit outlet. The circuit outlet is fluidly coupled to the flowpath downstream of the passage outlet. The air source is fluidly coupled to the circuit inlet.

The air source may be configured as or otherwise include a core flowpath.

The circuit outlet may be downstream of the passage outlet along the bypass flowpath.

The first distance between the ejector body and the flowpath wall may decrease as the ejector passage extends from the passage inlet towards the passage outlet.

The first distance between the ejector body and the flowpath wall may remain uniform as the ejector passage extends from the passage outlet towards the passage inlet.

A thickness of the ejector body may decrease as the ejector passage extends to the passage inlet.

A thickness of the ejector body may decrease as the ejector passage extends to the passage outlet.

The ejector body may be spaced radially inboard from an outer peripheral boundary of the bypass flowpath by a second distance. The second distance may be equal to or greater than five times the first distance.

The air circuit may be configured to direct air, bled from the core flowpath through the circuit inlet, along a trajectory through the circuit outlet into the bypass flowpath. The trajectory may have an axial component pointing axially away from the ejector body.

The trajectory may also have a circumferential component.

The ejector body may extend at least thirty degrees circumferentially about the axis.

The ejector body may extend at least forty-five degrees circumferentially about the axis.

The ejector body may extend circumferentially about the axis between opposing circumferential protrusion ends.

The ejector body may circumscribe the flowpath wall.

The assembly may also include a compressor section comprising a first compressor rotor and a second compressor rotor. The first compressor rotor may be upstream of the second compressor rotor along the core flowpath. The core flowpath may extend through the compressor section. The bypass flowpath may bypass the compressor section. The circuit inlet may be fluidly coupled to the core flowpath upstream of the second compressor rotor.

The circuit inlet may be disposed between the first compressor rotor and the second compressor rotor along the core flowpath.

The circuit inlet may be disposed along the first compressor rotor.

The assembly may also include a plurality of guide vanes disposed in the bypass flowpath upstream of the ejector body.

The assembly may also include a fan rotor rotatable about the axis. An airflow inlet into the core flowpath and an airflow inlet into the bypass flowpath may be next to and downstream of the fan rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
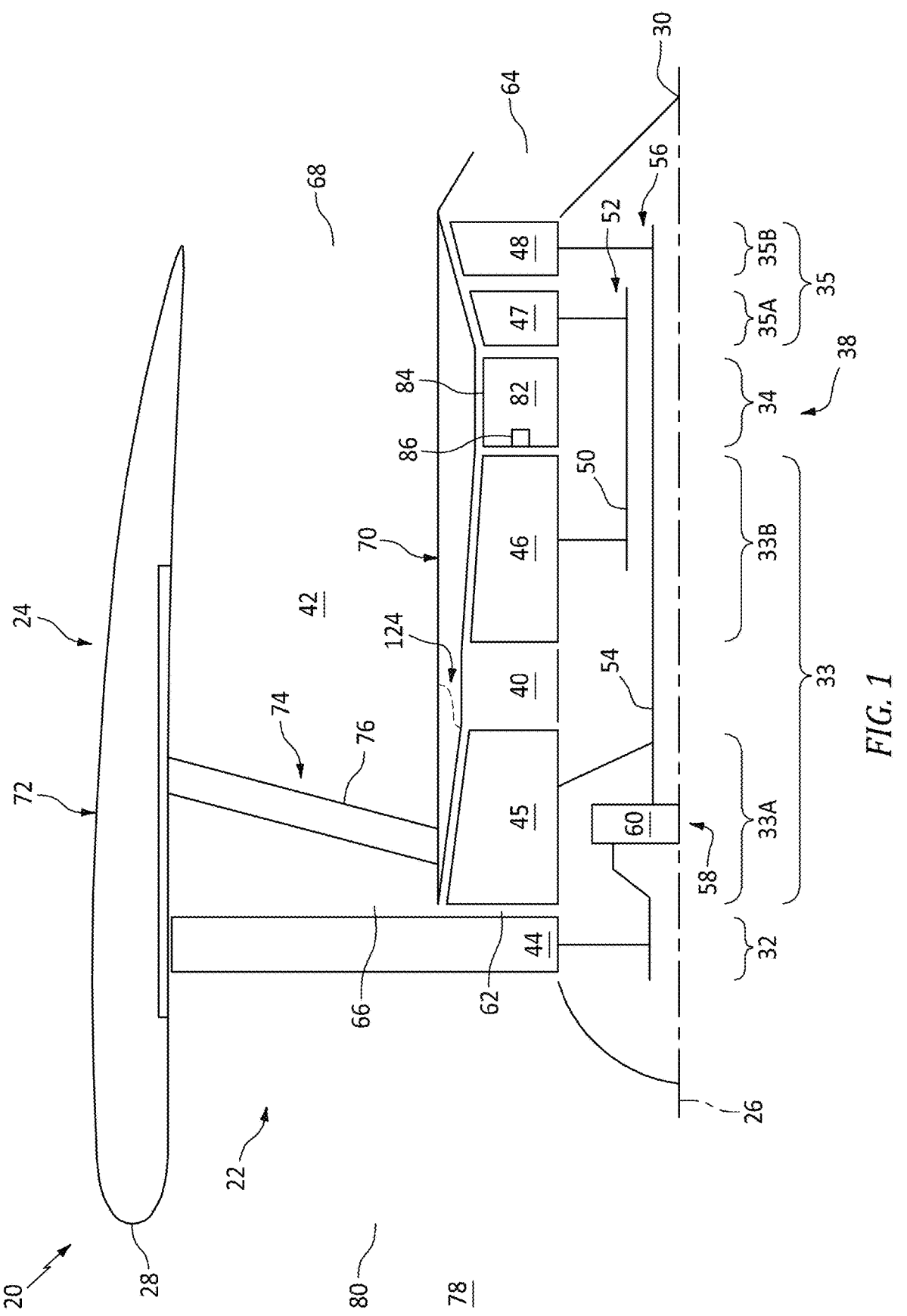
FIG. 1 is a partial schematic illustration of a propulsion system for an aircraft.

FIG. 1 illustrates a propulsion system 20 for an aircraft. The aircraft may be an airplane, a drone (e.g., an unmanned aerial vehicle (UAV)), or any other manned or unmanned aerial vehicle or system. The aircraft propulsion system 20 of FIG. 1 includes a gas turbine engine 22 (e.g., a turbofan engine) housed within a stationary housing structure 24. The aircraft propulsion system 20 extends axially along an axis 26 between an axial upstream, forward end 28 of the aircraft propulsion system 20 and an axial downstream, aft end 30 of the aircraft propulsion system 20. Briefly, the propulsion system axis 26 may be a centerline axis of the aircraft propulsion system 20, the turbine engine 22, the housing structure 24 and/or one or more of members of the turbine engine 22 and/or the housing structure 24. The propulsion system axis 26 may also or alternatively be a rotational axis for one or more members of the turbine engine 22.

The aircraft propulsion system 20 and its turbine engine 22 of FIG. 1 include a fan section 32, a compressor section 33, a combustor section 34 and a turbine section 35. The compressor section 33 of FIG. 1 includes a low pressure compressor (LPC) section 33A and a high pressure compressor (HPC) section 33B. The turbine section 35 of FIG. 1 includes a high pressure turbine (HPT) section 35A and a low pressure turbine (LPT) section 35B. At least (or only) the LPC section 33A, the HPC section 33B, the combustor section 34, the HPT section 35A and the LPT section 35B collectively form a core 38 of the turbine engine 22. The aircraft propulsion system 20 and its turbine engine 22 of FIG. 1 also include an inner core flowpath 40 (e.g., an annular core flowpath) and an outer bypass flowpath 42 (e.g., an annular bypass flowpath).

The fan section 32 includes a bladed fan rotor 44. The LPC section 33A includes a bladed low pressure compressor (LPC) rotor 45. The HPC section 33B includes a bladed high pressure compressor (HPC) rotor 46. The HPT section 35A includes a bladed high pressure turbine (HPT) rotor 47. The LPT section 35B includes a bladed low pressure turbine (LPT) rotor 48. Each of these engine rotors 44-48 includes a rotor base (e.g., a disk or a hub) and a plurality of rotor blades (e.g., airfoils, vanes, etc.). The rotor blades may be arranged into one or more stages axially along the respective engine rotor 44-48. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 46 is coupled to and rotatable with the HPT rotor 47. The HPC rotor 46 of FIG. 1, for example, is connected to the HPT rotor 47 through a high speed shaft 50. At least (or only) the HPC rotor 46, the HPT rotor 47 and the high speed shaft 50 collectively form a high speed rotating structure 52; e.g., a high speed spool of the turbine engine 22 and its engine core 38. This high speed rotating structure 52 of FIG. 1 and its members 46, 47 and 50 are rotatable about the propulsion system axis 26. However, it is contemplated the high speed rotating structure 52 may alternatively be rotatable about another axis radially and/or angularly offset from the rotational axis of the propulsor rotor and/or the centerline axis of the turbine engine 22.

The LPC rotor 45 is coupled to and rotatable with the LPT rotor 48. The LPC rotor 45 of FIG. 1, for example, is connected to the LPT rotor 48 through a low speed shaft 54. At least (or only) the LPC rotor 45, the LPT rotor 48 and the low speed shaft 54 collectively form a low speed rotating structure 56; e.g., a low speed spool of the turbine engine 22 and its engine core 38. This low speed rotating structure 56 of FIG. 1 and its members 45, 48 and 54 are rotatable about the propulsion system axis 26. However, it is contemplated the low speed rotating structure 56 may alternatively be rotatable about another axis radially and/or angularly offset from the rotational axis of the propulsor rotor and/or the centerline axis of the turbine engine 22.

The low speed rotating structure 56 is coupled to the fan rotor 44 through a drivetrain 58. The drivetrain 58 may be configured as a geared drivetrain, where a geartrain 60 (e.g., a transmission, a speed change device, an epicyclic geartrain, etc.) is disposed between and operatively couples the fan rotor 44 to the low speed rotating structure 56 and its LPT rotor 48. With this arrangement, the fan rotor 44 may rotate at a different (e.g., slower) rotational speed than the low speed rotating structure 56 and its LPT rotor 48. Here, the fan rotor 44 and the low speed rotating structure 56 may rotate in a common (the same) direction about the propulsion system axis 26 or in opposite directions about the propulsion system axis 26 depending, for example, upon the specific configuration of the geartrain 60. Alternatively, the drivetrain 58 may be configured as a direct-drive drivetrain, where the geartrain 60 is omitted. With such an arrangement, the fan rotor 44 rotates at a common (the same) rotational speed as the low speed rotating structure 56 and its LPT rotor 48.

The core flowpath 40 extends longitudinally sequentially through the LPC section 33A, the HPC section 33B, the combustor section 34, the HPT section 35A and the LPT section 35B from an airflow inlet 62 into the core flowpath 40 to a combustion products exhaust 64 out from the core flowpath 40. The bypass flowpath 42 extends longitudinally through a bypass duct from an airflow inlet 66 into the bypass flowpath 42 to an airflow exhaust 68 from the bypass flowpath 42. The bypass flowpath 42 and its bypass duct are configured to bypass (e.g., are disposed radially outboard of and extend along) the engine core 38. The core inlet 62 and the bypass inlet 66 are axially aligned along the propulsion system axis 26. The core inlet 62 and the bypass inlet 66 of FIG. 1 are also arranged axially next to and downstream of the fan rotor 44 and its fan blades. The core inlet 62 and the bypass inlet 66 may thereby be arranged downstream of the fan rotor 44 and its fan blades, without (e.g., any) other elements axially therebetween to obstruct, turn and/or otherwise influence the air propelled by the fan rotor 44 into the core inlet 62 and the bypass inlet 66 for example.

The fan section 32, the LPC section 33A, the HPC section 33B, the combustor section 34, the HPT section 35A and the LPT section 35B may be arranged sequentially along the propulsion system axis 26 within the housing structure 24. The housing structure 24 of FIG. 1, for example, includes an inner housing structure 70 and an outer housing structure 72. The housing structure 24 may also include a guide vane structure 74 such as a fan exit guide vane (FEGV) structure.

The inner housing structure 70 is disposed radially outboard of, extends axially along and may circumscribe one or more or all of the engine sections 33A-35B and the engine rotors 45-48. The inner housing structure 70 may thereby house and provide a support structure for the respective engine sections 33A-35B and the engine rotors 45-48. The inner housing structure 70 of FIG. 1 also forms a radial inner peripheral boundary of the bypass flowpath 42.

The outer housing structure 72 is disposed radially outboard of, extends axially along and may circumscribe the fan section 32 and its fan rotor 44 as well as the inner housing structure 70. The outer housing structure 72 may thereby house the fan section 32 and its fan rotor 44 as well as cover at least a forward upstream portion of the inner housing structure 70. The outer housing structure 72 of FIG. 1 also forms a radial outer peripheral boundary of the bypass flowpath 42.

The guide vane structure 74 includes a plurality of guide vanes 76. These guide vanes 76 are arranged and may be equispaced circumferentially around the inner housing structure 70 and the propulsion system axis 26 in an array; e.g., an annular array. The guide vanes 76 are disposed within the bypass flowpath 42. Each guide vane 76 of FIG. 1, for example, projects radially across the bypass flowpath 42 from the inner housing structure 70 to the outer housing structure 72. The guide vanes 76 may also be connected to the inner housing structure 70 and the outer housing structure 72 to structurally tie the inner housing structure 70 and the outer housing structure 72 together.

During operation of the aircraft propulsion system 20 of FIG. 1, ambient air from an environment 78 external to the aircraft and its aircraft propulsion system 20 enters the aircraft propulsion system 20 and its turbine engine 22 through an airflow inlet 80. This air is propelled by the rotating fan rotor 44 in a downstream, aft direction towards the propulsion system aft end 30.

An outer stream of the air propelled by the rotating fan rotor 44 is directed into the bypass flowpath 42 through its bypass inlet 66, which air entering the bypass flowpath 42 may be referred to as "bypass air". The guide vane structure 74 conditions (e.g., straightens out, de-swirls, etc.) the flow of the bypass air within the bypass duct. This conditioned bypass air is subsequently directed out of the aircraft propulsion system 20 through the bypass exhaust 68 to provide forward thrust. This propulsion of the bypass air may account for a majority of the forward thrust generated by the aircraft propulsion system 20 and its turbine engine 22 of FIG. 1.

An inner stream of the air propelled by the rotating fan rotor 44 is directed into the core flowpath 40 through its core inlet 62, which air entering the core flowpath 40 may be referred to as "core air". This core air is compressed by the LPC rotor 45 and the HPC rotor 46 and is directed into a combustion chamber 82 (e.g., annular combustion chamber) of a combustor 84 (e.g., annular combustor) in the combustor section 34. Fuel is injected into the combustion chamber 82 by one or more fuel injectors 86 and mixed with the compressed core air to provide a fuel-air mixture. This fuel-air mixture is ignited and combustion products thereof flow through and sequentially drive rotation of the HPT rotor 47 and the LPT rotor 48. The rotation of the HPT rotor 47 and the LPT rotor 48 respectively drive rotation of the HPC rotor 46 and the LPC rotor 45 and, thus, compression of the air received from the core inlet 62. The rotation of the LPT rotor 48 also drives rotation of the fan rotor 44 through the drivetrain 58.

Figure 2:
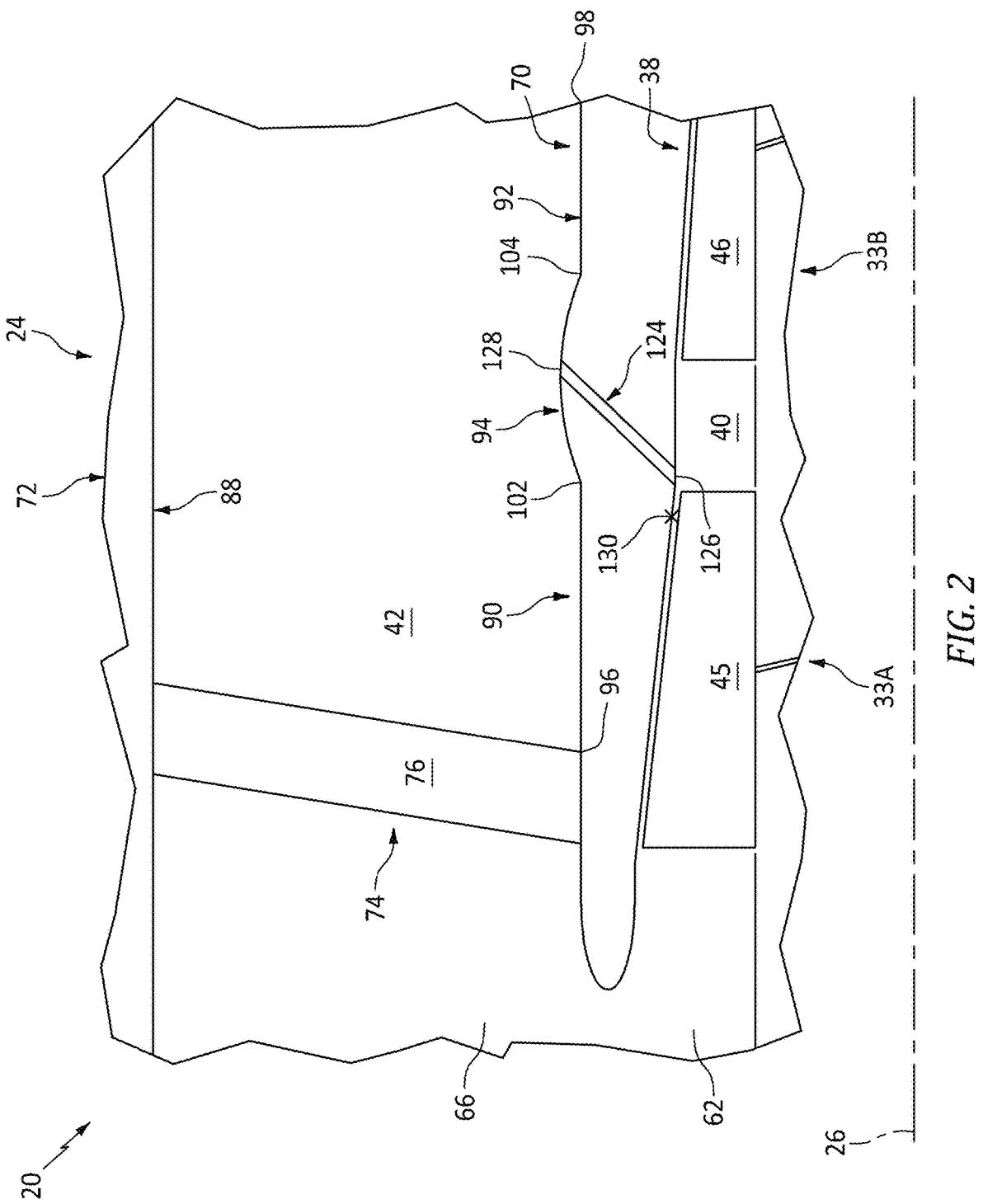
FIG. 2 is a schematic illustration of a portion of the propulsion system at an air circuit arranged with a protrusion.

Referring to FIG. 2, the outer housing structure 72 includes a radial outer flowpath wall 88 radially outboard of and bordering the bypass flowpath 42. This outer flowpath wall 88 extends axially along and circumferentially about (e.g., completely around) the propulsion system axis 26. With this arrangement, the outer flowpath wall 88 forms at least a portion of the outer peripheral boundary of the bypass flowpath 42, for example downstream of the guide vane structure 74.

The inner housing structure 70 includes a radial inner flowpath wall 90 radially inboard of and bordering the bypass flowpath 42. This inner flowpath wall 90 extends axially along and circumferentially about (e.g., completely around) the propulsion system axis 26. With this arrangement, the inner flowpath wall 90 forms at least a portion of the inner peripheral boundary of the bypass flowpath 42, for example downstream of the guide vane structure 74. Here, the outer flowpath wall 88 is spaced radially outboard of the inner flowpath wall 90. The outer flowpath wall 88 also extends axially along (e.g., axially overlaps) and extends circumferentially about (e.g., circumscribes) the inner flowpath wall 90. The inner flowpath wall 90 of FIG. 2 includes a wall base 92 and a wall protrusion 94.

The wall base 92 may be configured as a tubular panel forming the inner peripheral boundary of the bypass flowpath 42 upstream and downstream of the wall protrusion 94. The wall base 92 of FIG. 2, for example, extends axially along the propulsion system axis 26 and longitudinally along the bypass flowpath 42 from an upstream, forward end 96 of the wall base 92 to a downstream, aft end 98 of the wall base 92. The base forward end 96 of FIG. 2 is spaced axially upstream and forward of the wall protrusion 94. The base aft end 98 of FIG. 2 is spaced axially downstream and aft of the wall protrusion 94. The wall base 92 extends circumferentially about (e.g., completely around) the propulsion system axis 26. The wall base 92 may thereby axially overlap and circumscribe the engine core 38 and its compressor section 33.

Figure 3:
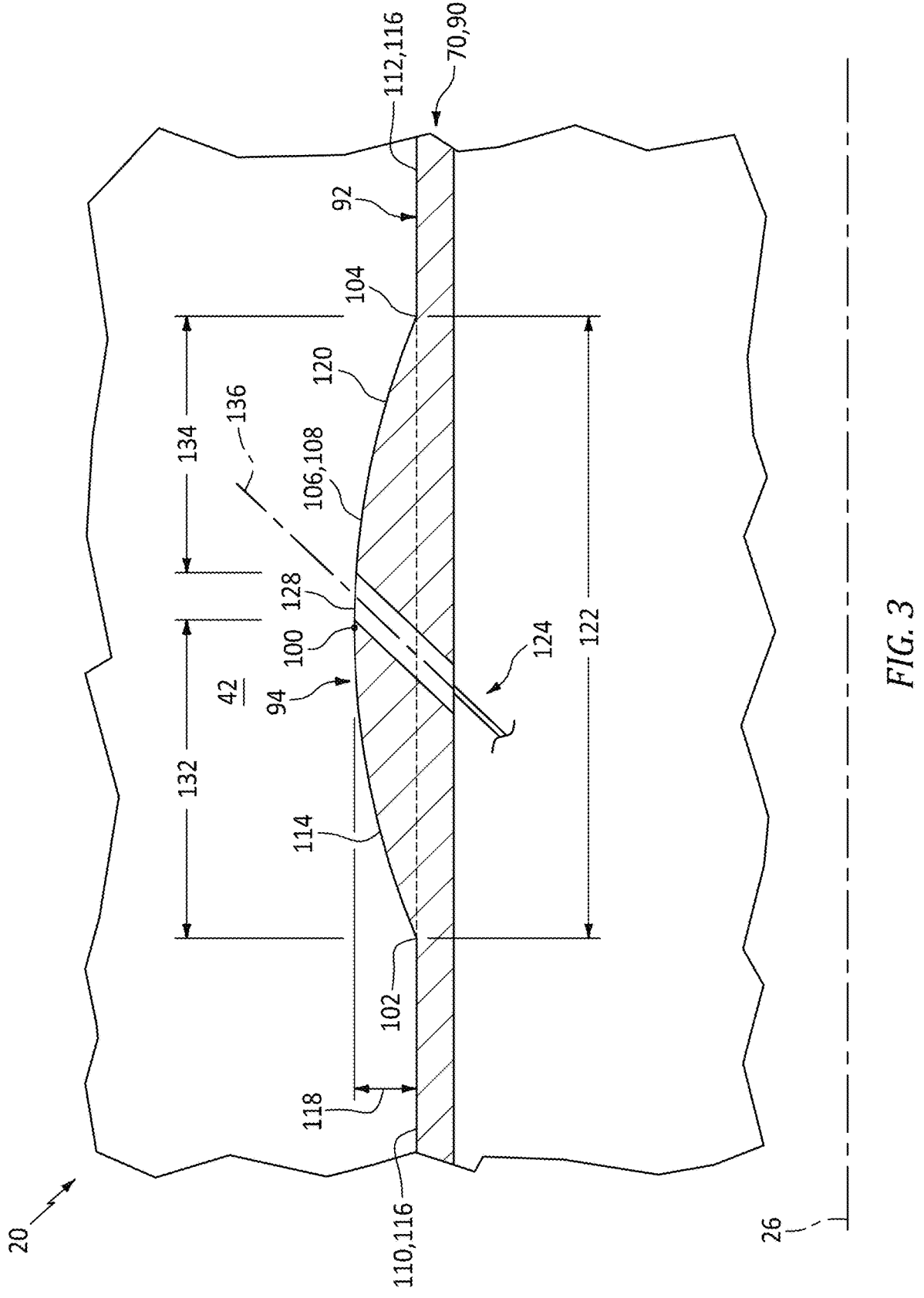
FIG. 3 is a sectional illustration of a portion of the propulsion system at a flowpath wall with the protrusion at an outlet from the air circuit.

Referring to FIG. 3, the wall protrusion 94 is connected to (e.g., formed integral with or otherwise attached to) the wall base 92. The wall protrusion 94 of FIG. 3 projects radially outward from the wall base 92, in a direction radially away from the propulsion system axis 26 and towards the outer housing structure 72 and its outer flowpath wall 88 (see FIG. 2), to a distal outer end 100 of the wall protrusion 94. The wall protrusion 94 extends axially along the propulsion system axis 26 and longitudinally along the bypass flowpath 42 from an upstream, forward end 102 of the wall protrusion 94 to a downstream, aft end 104 of the wall protrusion 94. The wall protrusion 94 extends circumferentially about (e.g., completely around) the propulsion system axis 26 and the wall base 92 of FIG. 3. The wall protrusion 94 may thereby have an annular geometry circumscribing the propulsion system axis 26.

The wall protrusion 94 has a radial outer surface 106 at a radial outer side 108 of the wall protrusion 94. This protrusion outer surface 106 borders the bypass flowpath 42, axially and longitudinally between an upstream, forward portion 110 of the wall base 92 and a downstream, aft portion 112 of the wall base 92. The protrusion outer surface 106 extends longitudinally along the bypass flowpath 42 between the protrusion forward end 102 and the protrusion aft end 104. The protrusion outer surface 106 extends along the bypass flowpath 42 circumferentially about (e.g., completely around) the propulsion system axis 26.

The protrusion outer surface 106 of FIG. 3 has a curved concave geometry when viewed in an axial reference plane parallel with (e.g., including) the propulsion system axis 26; e.g., a plane of FIG. 3. An upstream, forward end section 114 of the wall protrusion 94 and its protrusion outer surface 106 of FIG. 3, for example, radially tapers to a radial outer side 116 of the forward portion 110 of the wall base 92 as that forward end section 114 of the wall protrusion 94 projects axially and longitudinally from the protrusion outer end 100 to the forward portion 110 of the wall base 92. More particularly, a height 118 (e.g., radial height) of the wall protrusion 94 (e.g., continuously or incrementally) decreases as the forward end section 114 of the wall protrusion 94 and its protrusion outer surface 106 projects axially and longitudinally from the protrusion outer end 100 to the forward portion 110 of the wall base 92. This protrusion height 118 may be measured along the axial reference plane (e.g., radially) between the outer side 116 of the wall base 92 and the outer side 108 of the wall protrusion 94. Similarly, a downstream, aft end section 120 of the wall protrusion 94 and its protrusion outer surface 106 of FIG. 3 radially tapers to the outer side 116 of the aft portion 112 of the wall base 92 as that aft end section 120 of the wall protrusion 94 projects axially and longitudinally from the protrusion outer end 100 to the aft portion 112 of the wall base 92. More particularly, the protrusion height 118 of the wall protrusion 94 (e.g., continuously or incrementally) decreases as the aft end section 120 of the wall protrusion 94 and its protrusion outer surface 106 projects axially and longitudinally from the protrusion outer end 100 to the aft portion 112 of the wall base 92. Here, the protrusion outer end 100 may form a radial apex (e.g., a tip) of the wall protrusion 94 and its protrusion outer surface 106 between the protrusion forward end 102 and the protrusion aft end 104.

A length 122 (e.g., an axial length or a longitudinal length) of the wall protrusion 94 is measured from the protrusion forward end 102 to the protrusion aft end 104. The wall protrusion 94 has an aspect ratio-a ratio of the protrusion length 122 to the protrusion height 118. This aspect ratio may be between two and one-half (2.5) and twenty-five (25). More particularly, the aspect ratio may be between four (4) and fifteen (15), for example six (6). The present disclosure, however, is not limited to such exemplary aspect ratios as this aspect ratio may be altered based on various parameters such as a geometry of the wall base 92 and/or a pressure ratio between the core flowpath 40 and the bypass flowpath 42 of FIG. 1.

Figure 4:
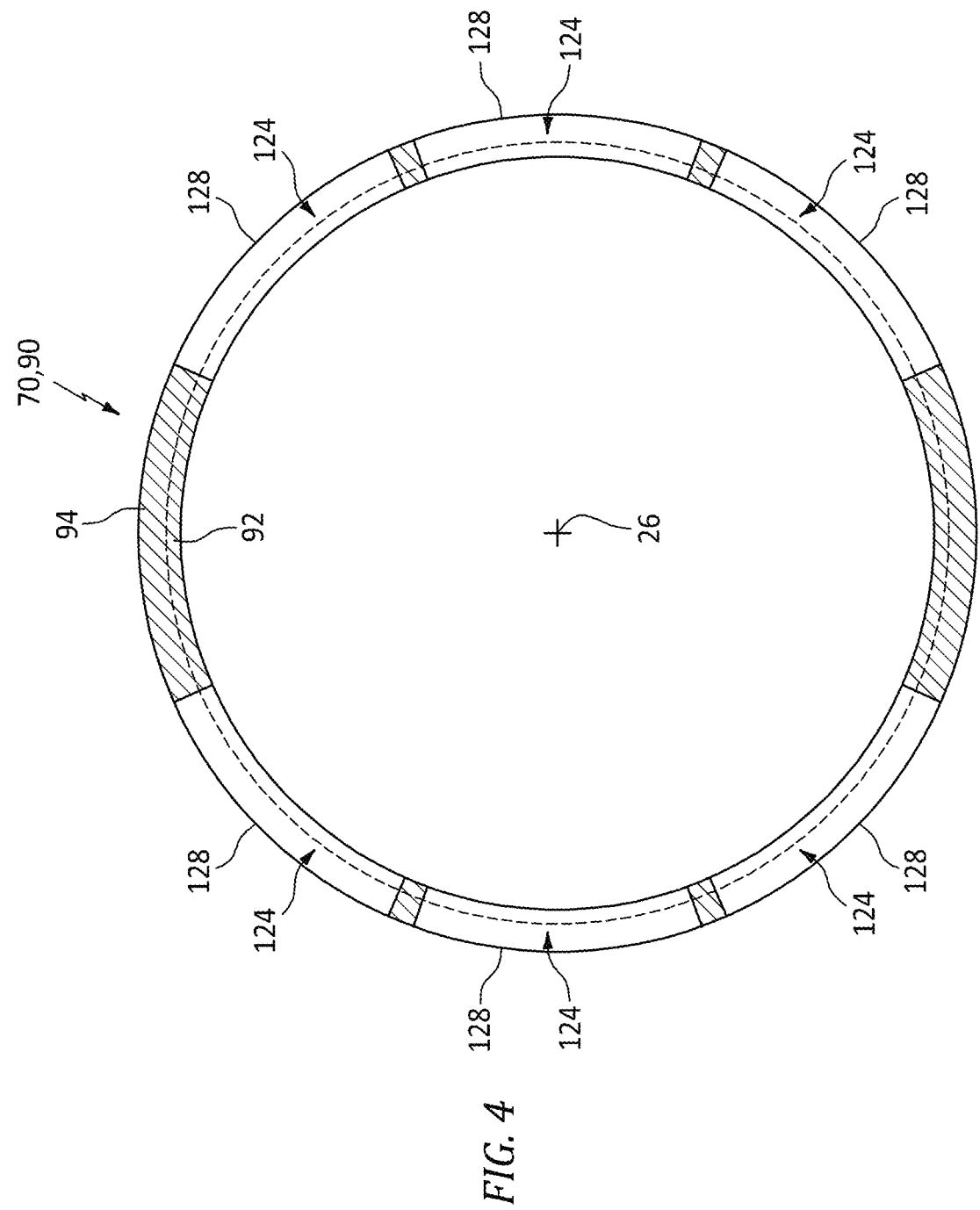
FIG. 4 is a cross-sectional illustration of the flowpath wall at the protrusion.

Referring to FIG. 2, the aircraft propulsion system 20 and its turbine engine 22 include one or more air circuits 124; e.g., bleed circuits. Referring to FIG. 4, the air circuits 124 are arranged and may or may not be equispaced circumferentially about the propulsion system axis 26 in an array; e.g., an annular array. Referring to FIG. 2, each air circuit 124 extends between and fluidly couples the core flowpath 40 to the bypass flowpath 42. Each air circuit 124 of FIG. 2, for example, extends longitudinally from an airflow inlet 126 into the respective air circuit 124 to an airflow outlet 128 from the respective air circuit 124.

The circuit inlet 126 fluidly couples the respective air circuit 124 to an air source such as the core flowpath 40. The circuit inlet 126 of FIG. 2, for example, is disposed longitudinally along the core flowpath 40 upstream of the combustor section 34 and its combustor 84 (see FIG. 1). The circuit inlet 126 may be disposed longitudinally along the core flowpath 40 within the compressor section 33. The circuit inlet 126 of FIG. 2, for example, is disposed longitudinally along the core flowpath 40 upstream of the HPC section 33B and its HPC rotor 46. More particularly, the circuit inlet 126 of FIG. 2 is disposed longitudinally along the core flowpath 40 between (a) the LPC section 33A and its LPC rotor 45 and (b) the HPC section 33B and its HPC rotor 46. The circuit inlet 126 may be configured as or otherwise include a bleed port (or multiple bleed ports) and/or a scoop (or multiple scoops) in and/or along a radial outer peripheral boundary of the core flowpath 40. The present disclosure, however, is not limited to such an exemplary circuit inlet arrangement. For example, it is contemplated the circuit inlet 126 may alternatively be disposed longitudinally along the LPC section 33A and its LPC rotor 45, for example at or about a downstream end of the LPC section 33A and its LPC rotor 45 such as alternative location 130.

The circuit outlet 128 fluidly couples the respective air circuit 124 to an air sink such as the bypass flowpath 42. The circuit outlet 128 of FIG. 2, for example, is disposed longitudinally along the bypass flowpath 42 and the inner flowpath wall 90, for example downstream of the guide vane structure 74. More particularly, referring to FIG. 3, the circuit outlet 128 is formed in the wall protrusion 94. The circuit outlet 128 of FIG. 3 is configured as an orifice piercing the protrusion outer surface 106 at (e.g., on, adjacent or proximate) the protrusion outer end 100. The circuit outlet 128 is thereby disposed axially and longitudinally between the protrusion forward end 102 and the protrusion aft end 104. Here, the circuit outlet 128 is disposed a first distance 132 along the propulsion system axis 26 (or longitudinally along the bypass flowpath 42) from the protrusion forward end 102. The circuit outlet 128 is disposed a second distance 134 along the propulsion system axis 26 (or longitudinally along the bypass flowpath 42) from the protrusion aft end 104. This second distance 134 may be between fifty percent (50%) of the first distance 132 and one-hundred and fifty percent (150%) of the first distance 132, inclusive. The second distance 134 of FIG. 3, for example, is approximately (e.g., within 2% or 5% of) or exactly equal to the first distance 132.

Referring to FIG. 2, during operation of each air circuit 124, the circuit inlet 126 bleeds a portion of the core air (compressed by the LPC section 33A and its LPC rotor 45) from the core flowpath 40. The circuit inlet 126 directs this bleed air into the respective air circuit 124. The bleed air flows longitudinally through each air circuit 124 to its circuit outlet 128. Each air circuit 124 subsequently directs the bleed air into the bypass flowpath 42 through the circuit outlet 128. Simultaneously, the bypass air flows along the wall protrusion 94 within the bypass flowpath 42. A geometry of the wall protrusion 94 may influence (e.g., decrease) a static pressure of the bypass air within the bypass flowpath 42 at the protrusion aft end 104. The bleed air exhausted from the air circuit 124 and its circuit outlet 128 may thereby be drawn along with the bypass air in a downstream direction towards the bypass exhaust 68 (see FIG. 1). Provision of the wall protrusion 94 at the circuit outlet 128 from each air circuit 124 may thereby reduce likelihood or prevent possibility of backflow of bypass air into each air circuit 124 through its circuit outlet 128.

Figure 5:
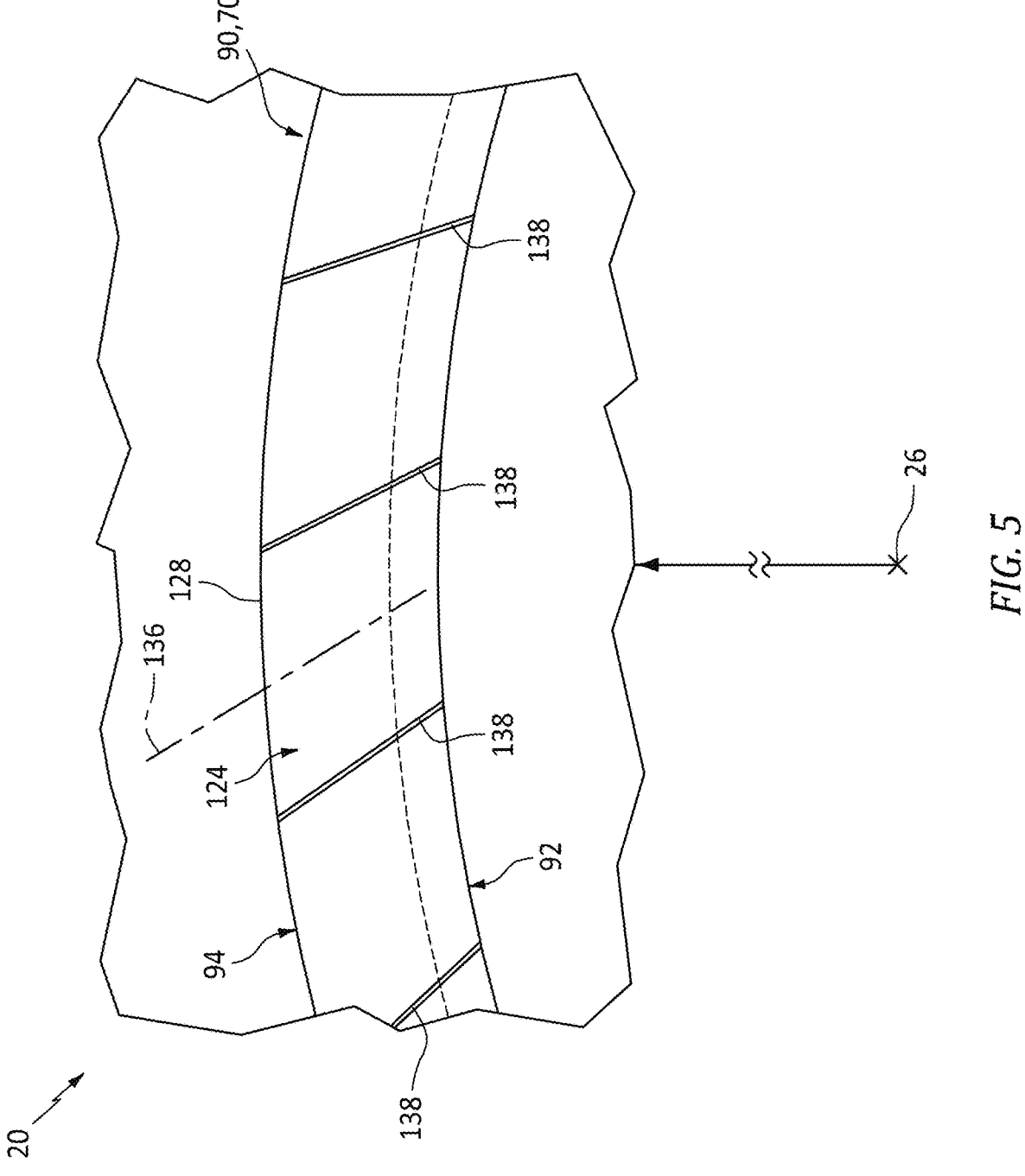
FIG. 5 is a cross-sectional illustration of a portion of the flowpath wall at the outlet from the air circuit.

Referring to FIG. 3, each air circuit 124 may be configured to direct the bleed air through its circuit outlet 128 into the bypass flowpath 42 along a trajectory 136. This trajectory 136 may have an axial component pointing axially downstream and aft, for example towards the protrusion aft end 104 and away from the protrusion forward end 102. Referring to FIG. 5, the trajectory 136 may also have a circumferential component pointing, for example, in a common (or opposite) direction of rotation of the fan rotor 44 of FIG. 1. This circumferential component may be imparted using vanes 138 within the respective air circuit 124 at its circuit outlet 128.

Figure 6:
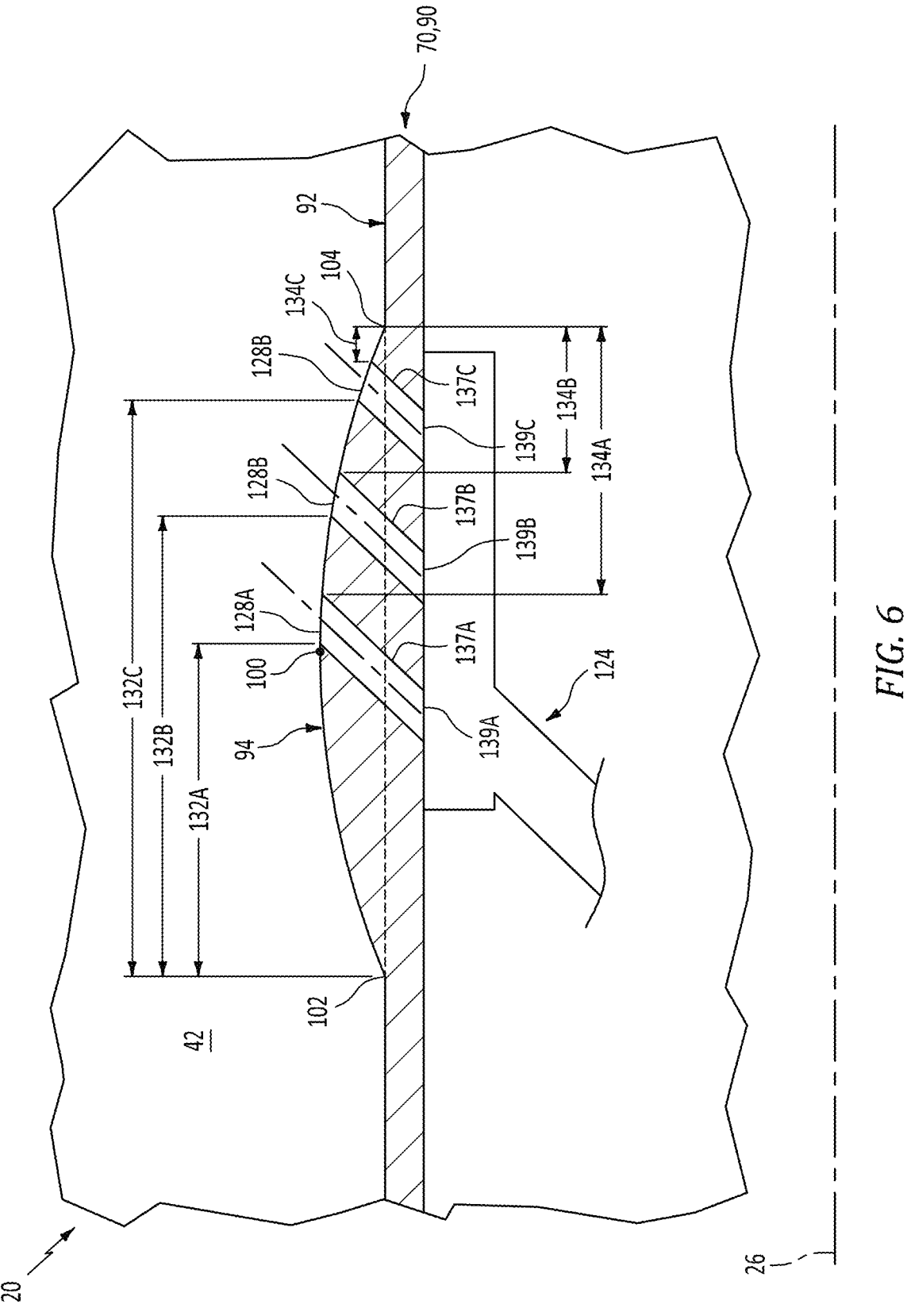
FIG. 6 is a sectional illustration of a portion of the propulsion system at the flowpath wall with another protrusion arrangement.

In some embodiments, referring to FIG. 3, each air circuit 124 may be configured with the single circuit outlet 128. In other embodiments, referring to FIG. 6, each air circuit 124 may be configured with and extend (e.g., in parallel) to multiple of the circuit outlets 128A-C (generally referred to as "128"). These circuit outlets 128 may be arranged at discrete positions along the wall protrusion 94 and its protrusion outer surface 106 between the protrusion forward end 102 and the protrusion aft end 104. In FIG. 6, an upstream, forwardmost one of the circuit outlets 128 along the bypass flowpath 42—the first circuit outlet 128A—may be located at (or about) the protrusion outer end 100 (e.g., the radial apex). In the specific arrangement of FIG. 6, the first circuit outlet 128A is disposed between the protrusion forward end 102 and the second circuit outlet 128B. The second circuit outlet 128B is disposed between the first circuit outlet 128A and the third circuit outlet 128C. The third circuit outlet 128C is disposed between the second circuit outlet 128B and the protrusion aft end 104. The present disclosure, however, is not limited to such an exemplary arrangement.

Each circuit outlet 128A-C of FIG. 6 may be configured as part of a passage 137A-C (generally referred to as "137") through the inner flowpath wall 90. Each passage 137A-C extends through the inner flowpath wall 90 from a respective inlet 139A-C (generally referred to as "139") to a respective one of the circuit outlets 128A-C. In some embodiments, each passage inlet 139A-C has an inlet area, and each circuit outlet 128A-C has an exit area. The equivalent diameter Din of each passage inlet 139 is defined as the diameter of a circle with an equal aggregate sectional area, which is calculated by Din=square root (4×Area/Pi).

The equivalent diameter Dout of each circuit outlet 128 is defined as the diameter of a circle with an equal aggregate sectional area, which is calculated by Dout=square root (4×Area/Pi). The first circuit outlet 128A has an equivalent diameter D128A. The second circuit outlet 128B has an equivalent diameter D128B. The third circuit outlet 128C has an equivalent diameter D128C. In some embodiments, the third circuit outlet equivalent diameter D128C may be greater than the second circuit outlet equivalent diameter D128B, and the first circuit outlet equivalent diameter D128A may be less than the second circuit outlet equivalent diameter D128B. In other embodiments, the third circuit outlet equivalent diameter D128C may be less than the second circuit outlet equivalent diameter D128B, and the first circuit outlet equivalent diameter D128A may be greater than the second circuit outlet equivalent diameter D128B.

The first circuit inlet 139A has an equivalent diameter D139A. The second circuit inlet 139B has an equivalent diameter D139B. The third circuit inlet 139C has an equivalent diameter D139C. In some embodiments, the third circuit inlet equivalent diameter D139C may be greater than the second circuit inlet equivalent diameter D139B, and the first circuit inlet equivalent diameter D139A may be less than the second circuit inlet equivalent diameter D139B. In other embodiments, the third circuit inlet equivalent diameter D139C may be less than the second circuit inlet equivalent diameter D139B, and the first circuit inlet equivalent diameter D139A may be greater than the second circuit inlet equivalent diameter D139B.

The equivalent diameter Din of the air circuit 124 may be defined as the diameter of a circle with an equal aggregate sectional area, which is calculated by Din=square root (4×Area/Pi). The square of the equivalent diameter Din of the air circuit 124 is greater than the sum of the square of the first circuit inlet equivalent diameter D139A plus the square of the second circuit inlet equivalent diameter D139B plus the square of the third circuit inlet equivalent diameter D139C. The first circuit inlet equivalent diameter D139A may be greater than the first circuit outlet equivalent diameter D128A. The second circuit inlet equivalent diameter D139B may be greater than the second circuit outlet equivalent diameter D128B. The third circuit inlet equivalent diameter D139C may be greater than the third circuit outlet equivalent diameter D128C. The present disclosure, however, is not limited to such an exemplary arrangement.

The first circuit outlet 128A is disposed axially and longitudinally between the protrusion forward end 102 and the protrusion aft end 104. Here, the circuit outlet 128A is disposed a first distance 132A along the propulsion system axis 26 (or longitudinally along the bypass flowpath 42) from the protrusion forward end 102. The first circuit outlet 128A is disposed a second distance 134A along the propulsion system axis 26 (or longitudinally along the bypass flowpath 42) from the protrusion aft end 104. This second distance 134A may be between fifty percent (50%) of the first distance 132 and one-hundred and fifty percent (150%) of the first distance 132, inclusive. The second distance 134A of FIG. 6, for example, is approximately (e.g., within 2% or 5% of) or exactly equal to the first distance 132A. The second circuit outlet 128B is disposed axially and longitudinally between the protrusion forward end 102 and the protrusion aft end 104. Here, the second circuit outlet 128B is disposed a first distance 132B along the propulsion system axis 26 (or longitudinally along the bypass flowpath 42) from the protrusion forward end 102. This first distance 132B may be between one-hundred percent (100%) of the first distance 132A and one-hundred and fifty percent (150%) of the first distance 132A, inclusive. The third circuit outlet 128C is disposed axially and longitudinally between the protrusion forward end 102 and the protrusion aft end 104. Here, the third circuit outlet 128C is disposed a first distance 132C along the propulsion system axis 26 (or longitudinally along the bypass flowpath 42) from the protrusion forward end 102. This first distance 132C is approximately (e.g., within 2% or 5% of) may between one-hundred and five percent (105%) of the first distance 132A and two-hundred percent (200%) of the first distance 132A, inclusive. The second circuit outlet 128B is disposed a second distance 134B along the propulsion system axis 26 (or longitudinally along the bypass flowpath 42) from the protrusion aft end 104. This second distance 134B may be between fifty percent (50%) of the first distance 132A and one-hundred percent (100%) of the first distance 132A, inclusive. The third circuit outlet 128C is disposed a second distance 134C along the propulsion system axis 26 (or longitudinally along the bypass flowpath 42) from the protrusion aft end 104. This second distance 134C may be between one percent (1%) of the first distance 132A and fifty percent (50%) of the first distance 132A, inclusive.

Figure 7:
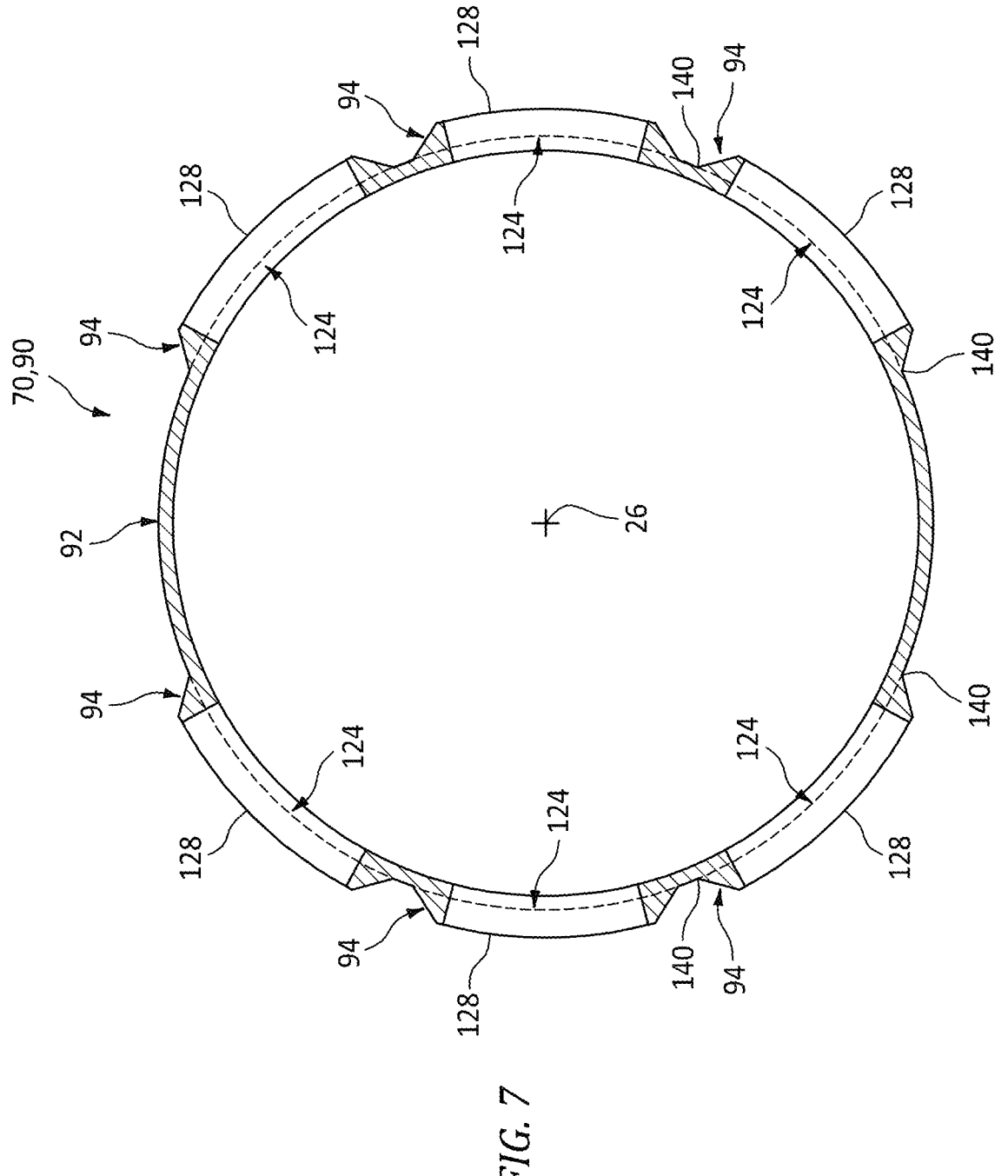
FIG. 7 is a cross-sectional illustration of the flowpath wall with multiple protrusions at air circuit outlets.

In some embodiments, the wall protrusion 94 may circumscribe the propulsion system axis 26 as generally described above. In other embodiments, referring to FIG. 7, the inner flowpath wall 90 may be configured with multiple of the wall protrusions 94. Each of these wall protrusions 94 may be dedicated to and associated with a respective one of the air circuits 124 and its circuit outlet 128 (or circuit outlets). The wall protrusions 94, for example, may be arranged circumferentially (e.g., end-to-end) about the propulsion system axis 26 in an array; e.g., an annular array. Each wall protrusion 94 of FIG. 7 extends partially circumferentially about the propulsion system axis 26 at least thirty degrees (30°) or forty-five degrees (45°) between opposing circumferential ends 140 of the respective wall protrusion 94. Each wall protrusion 94 may thereby have an arcuate geometry when viewed in a lateral reference plane perpendicular to the propulsion system axis 26; e.g., plane of FIG. 7.

As described above, the inner flowpath wall 90 may be configured with the wall protrusion(s) 94 to, inter alia, reduce or prevent backflow through the air circuits 124 as described above. The present disclosure, however, is not limited to such exemplary embodiments. For example, referring to FIG. 8, the inner flowpath wall 90 may be configured with an air ejector 142 in place of the wall protrusion(s) 94; e.g., see FIGS. 2 and 3. With the arrangement of FIG. 8, the circuit outlet 128 of each air circuit 124 may be formed in the wall base 92. The circuit outlet 128 of FIG. 8, for example, is configured as an orifice piercing an outer surface of the wall base 92.

Figure 8:
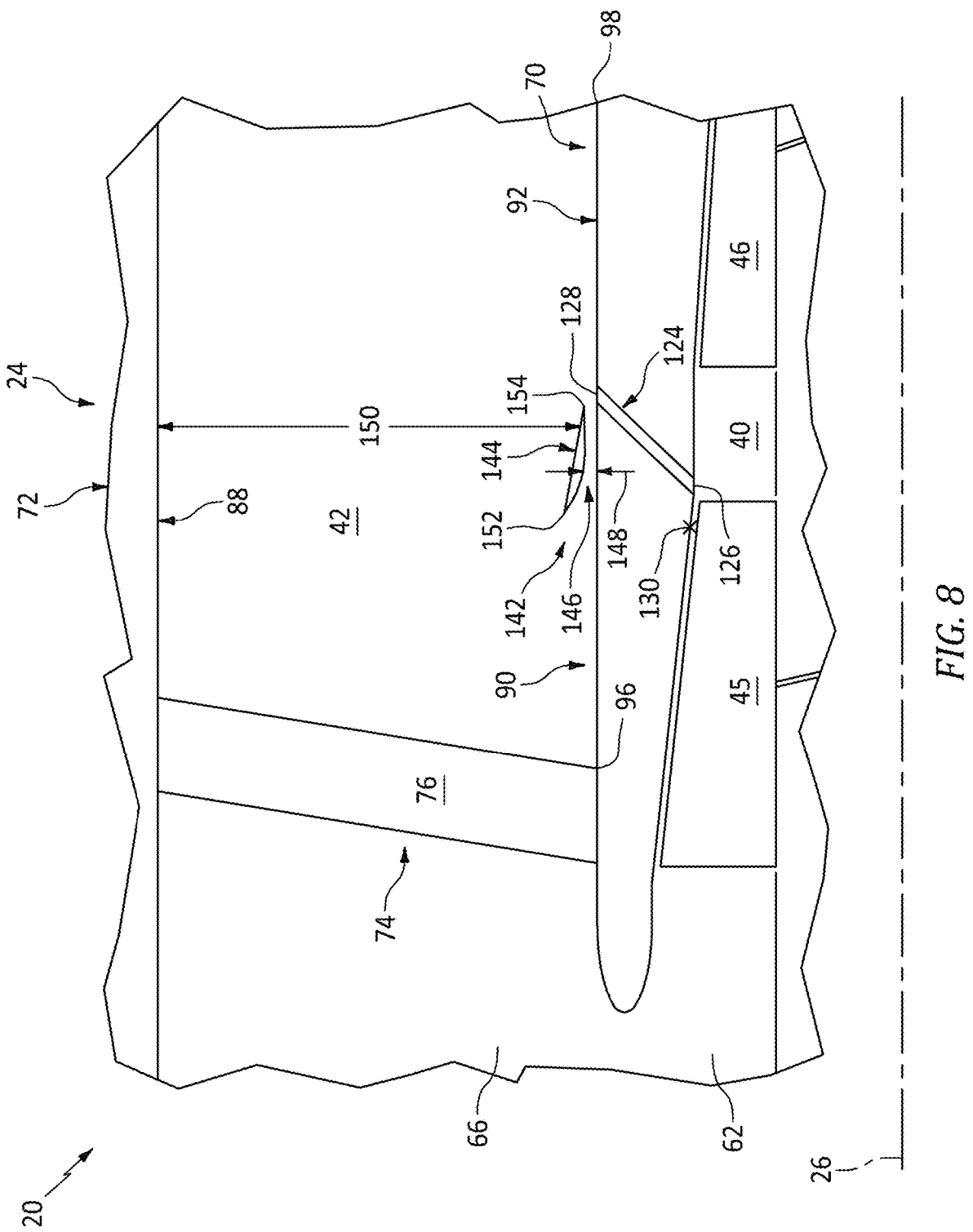
FIG. 8 is a schematic illustration of a portion of the propulsion system at the air circuit arranged with an air ejector body.

The air ejector 142 of FIG. 8 includes an ejector body 144, an ejector passage 146 and a section of the wall base 92 extending along the ejector body 144. The ejector body 144 may be disposed within the bypass flowpath 42, for example downstream and aft of the guide vane structure 74 and its guide vanes 76. The ejector body 144 of FIG. 8, for example, is disposed radially between the inner flowpath wall 90 and the outer flowpath wall 88. More particularly, the ejector body 144 is spaced radially outboard from the inner flowpath wall 90 and its wall base 92 by a body-to-inner wall distance 148; e.g., a radial distance. The ejector body 144 is spaced radially inboard from the outer flowpath wall 88 by a body-to-outer wall distance 150; e.g., a radial distance. This body-to-outer wall distance 150 may be significantly larger than the body-to-inner wall distance 148. The body-to-outer wall distance 150 of FIG. 8, for example, may be equal to or greater than ten times (10×), and less than or equal to one hundred times (100×) or more the body-to-inner wall distance 148.

Figure 9:
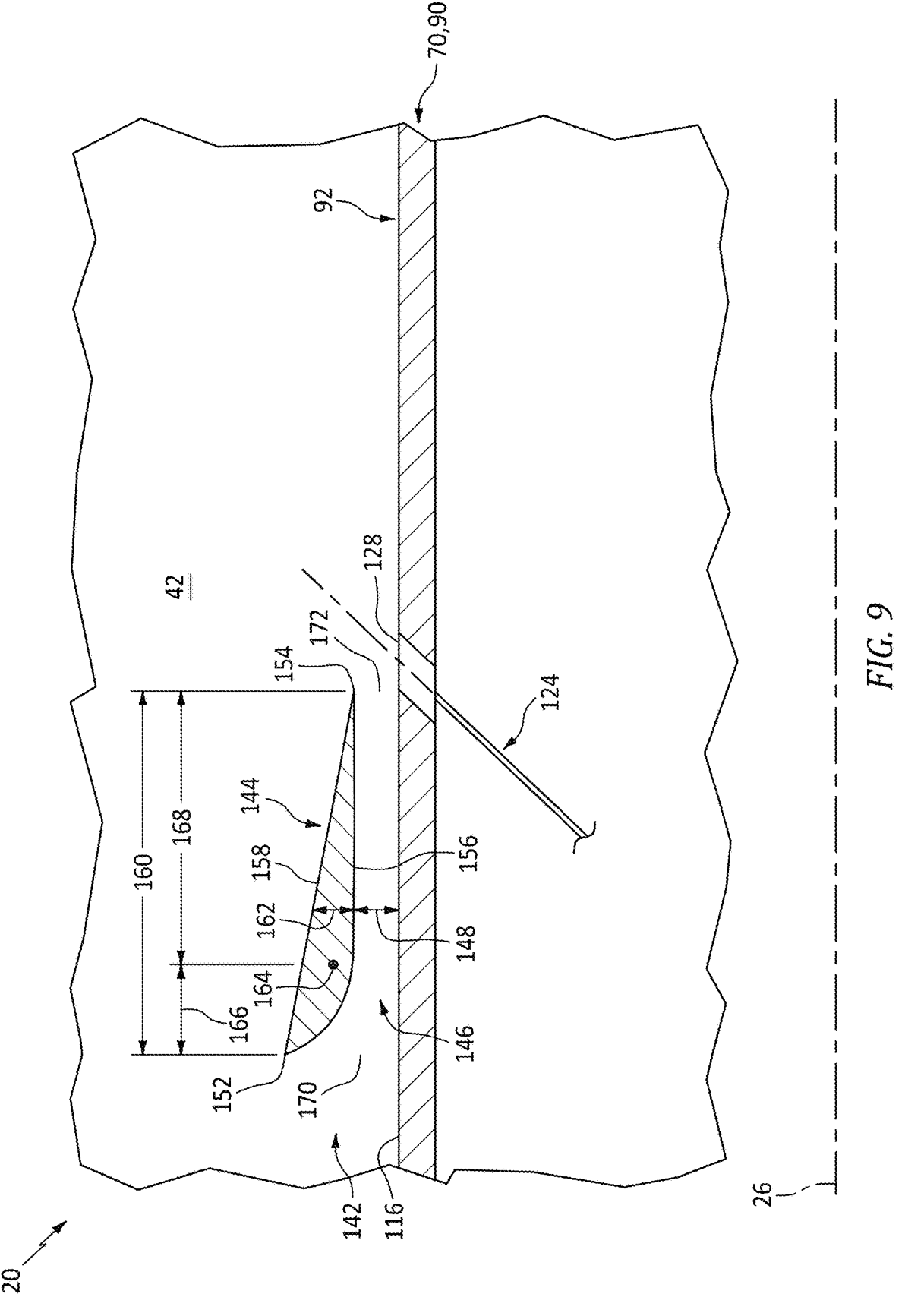
FIG. 9 is a sectional illustration of a portion of the propulsion system at the flowpath wall with the air ejector body at the outlet from the air circuit.

Referring to FIG. 9, the ejector body 144 extends axially along the propulsion system axis 26 and longitudinally along the bypass flowpath 42 from an upstream, forward end 152 of the ejector body 144 to a downstream, aft end 154 of the ejector body 144. The ejector body 144 extends radially from a radial inner side 156 of the ejector body 144 to a radial outer side 158 of the ejector body 144. The ejector body 144 extends circumferentially about (e.g., completely around) the propulsion system axis 26. The ejector body 144 may thereby axially overlap and circumscribe the inner flowpath wall 90 and its wall base 92.

A length 160 (e.g., an axial length or a longitudinal length) of the ejector body 144 is measured between the body forward end 152 and the body aft end 154. A thickness 162 (e.g., a radial thickness) of the ejector body 144 is measured between the body inner side 156 and the body outer side 158. The ejector body 144 of FIG. 9 has an aspect ratio-a ratio of the body length 160 to the body thickness 162. This aspect ratio may be between four (4) and eleven (11), for example seven and one-half (7.5).

The ejector body 144 may have an airfoil shaped geometry when viewed in the axial reference plane; e.g., the plane of FIG. 9. The body inner side 156 and the body outer side 158, for example, may radially converge and meet at the body forward end 152 as the ejector body 144 projects axially and/or longitudinally from an intermediate location 164 (or region) to the body forward end 152. The body thickness 162 may thereby (e.g., continuously or incrementally) decrease as the ejector body 144 projects axially and/or longitudinally from the intermediate location 164 to the body forward end 152. Here, the body forward end 152 may form a leading edge of the ejector body 144. Similarly, the body inner side 156 and the body outer side 158 may radially converge and meet at the body aft end 154 as the ejector body 144 projects axially and/or longitudinally from the intermediate location 164 (or region) to the body aft end 154. The body thickness 162 may thereby (e.g., continuously or incrementally) decrease as the ejector body 144 projects axially and/or longitudinally from the intermediate location 164 to the body aft end 154. Here, the body aft end 154 may form a trailing edge of the ejector body 144.

The intermediate location 164 (or region) is disposed axially and longitudinally along the ejector body 144 between the body forward end 152 and the body aft end 154. This intermediate location 164 may coincide with a point (or region) where the body thickness 162 has its largest (e.g., maximum) value. The intermediate location 164 is disposed a first distance 166 (e.g., an axial distance or a longitudinal distance) from the body forward end 152. The intermediate location 164 of FIG. 9 is disposed a second distance 168 (e.g., an axial distance or a longitudinal distance) from the body aft end 154. This second distance 168 may be equal to or greater than the first distance 166.

The ejector passage 146 is formed by and extends radially between (a) the inner flowpath wall 90 and its wall base 92 and (b) the ejector body 144 and its body inner side 156. Where the ejector body 144 is disposed within the bypass flowpath 42, the ejector passage 146 is configured as a portion of the bypass flowpath 42 radially inboard of and axially overlapped by the ejector body 144. The inner flowpath wall 90 and its wall base 92 form a radial inner peripheral boundary of the ejector passage 146. The ejector body 144 and its body inner side 156 form a radial outer peripheral boundary of the ejector passage 146. The ejector passage 146 extends axially along the propulsion system axis 26 and longitudinally along the bypass flowpath 42 from an airflow inlet 170 into the ejector passage 146 to an airflow outlet 172 from the ejector passage 146. The passage inlet 170 is disposed at the body forward end 152. The passage outlet 172 is disposed at the body aft end 154. Moreover, the passage outlet 172 of FIG. 9 is disposed at (or near) the circuit outlet 128 of each air circuit 124. The circuit outlet 128 of FIG. 9, for example, is disposed next to and downstream of the passage outlet 172.

The ejector passage 146 may diverge as an upstream section of the ejector passage 146 projects axially and/or longitudinally from the intermediate location 164 (or region) to the passage inlet 170. The body-to-inner wall distance 148 of FIG. 9, for example, (e.g., continuously or incrementally) increases as the upstream section of the ejector passage 146 projects axially and/or longitudinally from the intermediate location 164 to the passage inlet 170. By contrast, the ejector passage 146 may remain substantially uniform (e.g., constant) as a downstream section of the ejector passage 146 projects axially and/or longitudinally from the intermediate location 164 (or region) to the passage outlet 172. The body-to-inner wall distance 148 of FIG. 9, for example, remains substantially uniform as the upstream section of the ejector passage 146 projects axially and/or longitudinally from the intermediate location 164 to the passage inlet 170. In other embodiments, however, it is contemplated the body-to-inner wall distance 148 may alternatively (e.g., slightly) decrease such that the downstream section of the ejector passage 146 converges to the passage outlet 172.

The air circuit 124 of FIG. 9 may operate in a similar manner as described above with respect to the arrangement of FIG. 2. However, by contrast to the arrangement of FIG. 2, a portion of the bypass air enters the ejector passage 146 of FIG. 9 through the passage inlet 170. This air is accelerated by the air ejector 142 as the air flows through the ejector passage 146 from the passage inlet 170 to the passage outlet 172. This air is then reintroduced back in the full bypass flowpath 42 as an accelerated stream of bypass air. By directing the accelerated stream of bypass air across the circuit outlet 128 of each air circuit 124, the air ejector 142 may operably function as a vacuum pump to draw the bleed air out of the air circuit 124 into the bypass flowpath 42. Moreover, by accelerating the bypass air, momentum of the bypass air will reduce likelihood of that bypass air from turning and backflowing into each ear circuit through its circuit outlet 128.

Referring still to FIG. 9, the equivalent diameter Dout of the circuit outlet 128 outlet is defined as the diameter of a circle with an equal aggregate sectional area, which is calculated by Dout=square root (4×Area/Pi). The airflow outlet 172 from the ejector passage 146 has the equivalent diameter Dout of the airflow outlet 172 defined as the diameter of a circle with an equal aggregate sectional area, which is calculated by Dout=square root (4×Area/Pi). The equivalent diameter Dout of the airflow outlet 172 is greater than the second circuit outlet equivalent diameter D128. The equivalent diameter Dout of the airflow outlet 172 of FIG. 9, for example, may be equal to or greater than two times (2×) the equivalent diameter Dout of the circuit outlet 128, and less than or equal to twenty times (20×) or more the equivalent diameter Dout of the circuit outlet 128.

Figure 10:
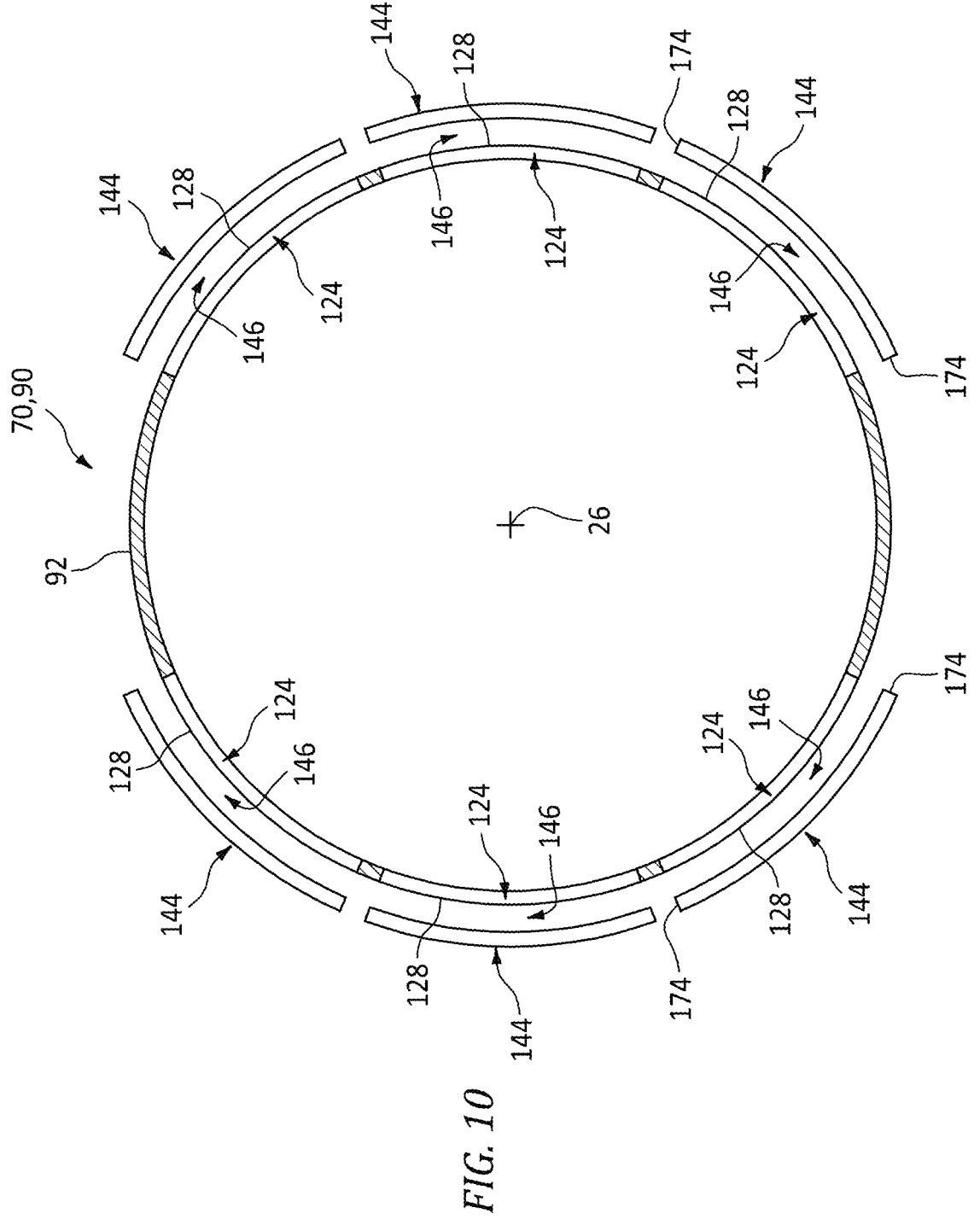
FIG. 10 is a cross-sectional illustration of the flowpath wall with multiple air ejector bodies at air circuit outlets.

In some embodiments, the ejector body 144 may circumscribe the propulsion system axis 26 as generally described above. In other embodiments, referring to FIG. 10, the air ejector 142 may be configured with multiple ejector bodies 144. Each of these ejector bodies 144 may be dedicated to and associated with a respective one of the air circuits 124 and its circuit outlet 128 (or circuit outlets). The ejector bodies 144, for example, may be arranged circumferentially (e.g., end-to-end) about the propulsion system axis 26 in an array; e.g., an annular array. Each ejector body 144 of FIG. 10 extends partially circumferentially about the propulsion system axis 26 at least thirty degrees (30°) or forty-five degrees (45°) between opposing circumferential ends 174 of the respective ejector body 144. Each ejector body 144 may thereby have an arcuate geometry when viewed in the lateral reference plane; e.g., plane of FIG. 10.

While various embodiments of the present disclosure have been described, it will be apparent to those of ordinary skill in the art that many more embodiments and implemen-tations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a core flowpath extending axially along an axis;
   a bypass flowpath radially outboard of the core flowpath, the bypass flowpath extending axially along the axis;
   a flowpath wall forming an inner peripheral boundary of the bypass flowpath, the flowpath wall extending axially along and circumferentially about the axis;
   an ejector body disposed in the bypass flowpath, the ejector body spaced radially outboard from the flowpath wall by a first distance such that a portion of the flowpath radially between the ejector body and the flowpath wall forms an ejector passage, and the ejector passage extending axially along the axis from a passage inlet to a passage outlet; and
   an air circuit extending from a circuit inlet to a circuit outlet, the circuit inlet fluidly coupled to the core flowpath, and the circuit outlet fluidly coupled to the bypass flowpath at the passage outlet,
   wherein the ejector passage is configured to accelerate a flow of bypass air to draw bleed air out of the air circuit.

2. The assembly of claim 1, wherein the circuit outlet is downstream of the passage outlet along the bypass flowpath.

3. The assembly of claim 1, wherein the first distance between the ejector body and the flowpath wall decreases as the ejector passage extends from the passage inlet towards the passage outlet.

4. The assembly of claim 1, wherein the first distance between the ejector body and the flowpath wall remains uniform as the ejector passage extends from the passage outlet towards the passage inlet.

5. The assembly of claim 1, wherein a thickness of the ejector body decreases as the ejector passage extends to the passage inlet.

6. The assembly of claim 1, wherein a thickness of the ejector body decreases as the ejector passage extends to the passage outlet.

7. The assembly of claim 1, wherein
   the ejector body is spaced radially inboard from an outer peripheral boundary of the bypass flowpath by a second distance; and
   the second distance is equal to or greater than five times the first distance.

8. The assembly of claim 1, wherein
   the air circuit is configured to direct air, bled from the core flowpath through the circuit inlet, along a trajectory through the circuit outlet into the bypass flowpath; and
   the trajectory has an axial component pointing axially away from the ejector body.

9. The assembly of claim 8, wherein the trajectory further has a circumferential component.

10. The assembly of claim 1, wherein the ejector body extends at least thirty degrees circumferentially about the axis.

11. The assembly of claim 1, wherein the ejector body extends at least forty-five degrees circumferentially about the axis.

12. The assembly of claim 1, wherein the ejector body extends circumferentially about the axis between opposing circumferential protrusion ends.

13. The assembly of claim 1, wherein the ejector body circumscribes the flowpath wall.

14. The assembly of claim 1, further comprising:

a compressor section comprising a first compressor rotor and a second compressor rotor, the first compressor rotor upstream of the second compressor rotor along the core flowpath;

the core flowpath extending through the compressor section;

the bypass flowpath bypassing the compressor section; and the circuit inlet fluidly coupled to the core flowpath upstream of the second compressor rotor.

15. The assembly of claim 14, wherein the circuit inlet is disposed between the first compressor rotor and the second compressor rotor along the core flowpath.

16. The assembly of claim 14, wherein the circuit inlet is disposed along the first compressor rotor.

17. The assembly of claim 1, further comprising a plurality of guide vanes disposed in the bypass flowpath upstream of the ejector body.

18. The assembly of claim 1, further comprising:

a fan rotor rotatable about the axis;

an airflow inlet into the core flowpath and an airflow inlet into the bypass flowpath next to and downstream of the fan rotor.

19. An assembly for an aircraft propulsion system, comprising:

a flowpath extending axially along an axis;

a flowpath wall forming an inner peripheral boundary of the flowpath, the flowpath wall extending axially along and circumferentially about the axis;

an ejector body spaced radially outboard from the flowpath wall such that an ejector passage is formed by and disposed radially between the ejector body and the flowpath wall, the ejector passage extending axially along the axis from a passage inlet to a passage outlet;

an air circuit extending from a circuit inlet to a circuit outlet, the circuit outlet fluidly coupled to the flowpath next to and downstream of the passage outlet; and an air source fluidly coupled to the circuit inlet, wherein the ejector passage is configured to accelerate a flow of bypass air to draw bleed air out of the air circuit.

20. An assembly for an aircraft propulsion system, comprising:

a flowpath extending axially along an axis;

a flowpath wall forming an inner peripheral boundary of the flowpath, the flowpath wall extending axially along and circumferentially about the axis;

an ejector body disposed radially outboard of and extending circumferentially about the flowpath wall;

an ejector passage formed by and disposed radially between the ejector body and the flowpath wall, the ejector passage extending axially along the axis from a passage inlet to a passage outlet;

an air circuit extending from a circuit inlet to a circuit outlet, the circuit outlet fluidly coupled to the flowpath downstream of the passage outlet; and an air source fluidly coupled to the circuit inlet, wherein the ejector passage is configured to accelerate a flow of bypass air to draw bleed air out of the air circuit.

* * * * *